(12) United States Patent
Kato et al.

(10) Patent No.: US 12,330,542 B2
(45) Date of Patent: Jun. 17, 2025

(54) VEHICLE SEAT ARMREST

(71) Applicant: NHK SPRING CO., LTD., Yokohama (JP)

(72) Inventors: Kazuhito Kato, Yokohama (JP); Kousuke Suzuki, Yokohama (JP); Chikanori Honda, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 232 days.

(21) Appl. No.: 18/325,539

(22) Filed: May 30, 2023

(65) Prior Publication Data

US 2023/0382281 A1 Nov. 30, 2023

(30) Foreign Application Priority Data

May 31, 2022 (JP) .................................. 2022-088977

(51) Int. Cl.
*B60N 2/75* (2018.01)
*B60N 2/02* (2006.01)
*B60R 11/00* (2006.01)

(52) U.S. Cl.
CPC ............. *B60N 2/767* (2018.02); *B60N 2/753* (2018.02)

(58) Field of Classification Search
CPC . B60N 2/767; B60N 2/753; B60R 2011/0014; B60R 2011/0082
See application file for complete search history.

(56) References Cited

U.S. PATENT DOCUMENTS

| | | | | |
|---|---|---|---|---|
| 10,513,210 B2* | 12/2019 | Gomez | ................... | B60N 2/20 |
| 11,285,850 B2* | 3/2022 | Gayon | ................... | B60N 2/797 |
| 12,115,892 B2* | 10/2024 | Lee | ................... | B60N 2/797 |
| 2018/0304789 A1* | 10/2018 | Robert | ................... | B60N 2/777 |
| 2019/0077288 A1* | 3/2019 | Gayon | ................... | B60N 2/797 |
| 2023/0158932 A1* | 5/2023 | Lee | ................... | B60N 2/773 |
| | | | | 297/411.36 |
| 2023/0191968 A1* | 6/2023 | Lee | ................... | B60N 2/753 |
| | | | | 297/411.3 |
| 2023/0382281 A1* | 11/2023 | Kato | ................... | B60N 2/753 |
| 2024/0101012 A1* | 3/2024 | Stephan | ................... | B60N 2/793 |

FOREIGN PATENT DOCUMENTS

JP 2014-226999 A 12/2014

* cited by examiner

*Primary Examiner* — Shin H Kim
(74) *Attorney, Agent, or Firm* — Knobbe, Martens, Olson & Bear, LLP

(57) ABSTRACT

The armrest of a vehicle seat is provided with a first armrest and a second armrest. The first armrest includes a first end portion rotatably supported by a side portion of a seatback, and selectively adopts a not-in-use position in which the first armrest is positioned so as to extend toward a seat upper side at the seatback side portion, and an in-use position in which the first armrest is positioned so as to be rotated from the seatback side portion toward a seat front side, so as to extend toward the seat front side. The second armrest includes a first end portion rotatably supported by a second end portion of the first armrest and, in the in-use position, selectively adopts a stowed position in which the second armrest is positioned at an upper surface side of the first armrest, and a deployed position in which the second armrest is positioned so as to be rotated from the upper surface side of the first armrest toward the seat front side, so as to extend obliquely toward a seat upper side in side view and so as to extend obliquely toward a seat width direction inside in plan view.

6 Claims, 15 Drawing Sheets

VEHICLE SEAT ARMREST

CROSS-REFERENCE TO RELATED APPLICATION

This application claims priority under 35 USC 119 from Japanese Patent Application No. 2022-088977 filed May 31, 2022, the disclosure of which is incorporated by reference herein in its entirety.

BACKGROUND

Technical Field

The present disclosure relates to an armrest for a vehicle seat.

Related Art

A hitherto known vehicle seat armrest is configured so as to enable adjustment of both a height of an armrest body and an inclination angle of an upper surface of the armrest body (see, for example, Japanese Patent Application Laid-Open (JP-A) No. 2014-226999). Moreover, due to recent proliferation of display media such as smartphones and tablets, there are now many opportunities to view screens, such as hand-held smartphones, in a state of resting an elbow on an armrest in a vehicle, for example.

SUMMARY

However, when viewing screens of smartphones with an elbow placed on an armrest, the hand holding the smartphone sometimes swings about a pivot point of the elbow due to vibrations during vehicle travel, which makes viewing the smartphone screen difficult, and reduces operability of the smartphone. Moreover, the possibility of neck pain developing and of car sickness occurring rises due to gazing at the screen of a swinging smartphone in a downward facing posture for a prolonged period of time.

In order to address this issue, the present disclosure provides a vehicle seat armrest capable of suppressing swinging of a hand-held display media during vehicle travel.

A vehicle seat armrest according to a first aspect of the present disclosure includes a first armrest and a second armrest. The first armrest includes a first end portion rotatably supported by a side portion of a seatback, and selectively adopts a not-in-use position in which the first armrest is positioned so as to extend toward a seat upper side at the seatback side portion, and an in-use position in which the first armrest is positioned so as to be rotated from the seatback side portion toward a seat front side, so as to extend toward the seat front side. The second armrest includes a first end portion rotatably supported by a second end portion of the first armrest and, in the in-use position, selectively adopts a stowed position in which the second armrest is positioned at an upper surface side of the first armrest, and a deployed position in which the second armrest is positioned so as to be rotated from the upper surface side of the first armrest toward the seat front side, so as to extend obliquely toward a seat upper side in side view and so as to extend obliquely toward a seat width direction inside in plan view.

In the armrest according to the first aspect, in the in-use position in which the first armrest is positioned so as to be rotated from the seatback side portion toward the seat front side, so as to extend toward the seat front side, the second armrest adopts the deployed position by the second armrest being rotated from an upper surface side of the first armrest toward the seat front side. The second armrest is positioned so as to extend obliquely toward the seat upper side in side view and so as to extend obliquely toward the seat width direction inside in plan view. Thus the elbow to the back of the hand of the occupant seated in the vehicle seat is supported by the second armrest at an appropriate angle. Swinging of a hand-held display medium during vehicle travel is accordingly suppressed.

A vehicle seat armrest according to a second aspect of the present disclosure is the vehicle seat armrest according to the first aspect, wherein the second armrest is formed in a cuboidal shape and, in the deployed position, is positioned obliquely such that an upper surface of the second armrest faces toward the seat width direction inside and the seat upper side in front view.

In the armrest according to the second aspect, the second armrest is formed in the cuboidal shape, and in the deployed position the second armrest is positioned obliquely such that the upper surface of the second armrest faces toward the seat width direction inside and the seat upper side in front view. This accordingly means that the elbow to the back of the hand of the occupant seated in the vehicle seat is supported at an appropriate (natural) angle such that the display media is easier to look at than cases in which the upper surface of the second armrest faces toward the seat upper side in front view.

A vehicle seat armrest according to a third aspect of the present disclosure is the vehicle seat armrest according to the first aspect or the second aspect, further including a third armrest. The third armrest includes a first end portion rotatably supported by a second end portion of the second armrest and that, in the deployed position, selectively adopts a folded position in which the third armrest is positioned at an upper surface side of the second armrest and an extended position in which the third armrest is positioned so as to be rotated from the upper surface side of the second armrest toward the seat front side, so as to extend obliquely toward the seat upper side in side view.

In the armrest according to the third aspect, in the deployed position of the second armrest, the third armrest adopts the extended position by being rotated from the upper surface side of the second armrest toward the seat front side. The third armrest is positioned so as to extend obliquely toward the seat upper side in side view. Thus the elbow to the back of the hand of the occupant seated in the vehicle seat is supported by the third armrest at an appropriate (natural) angle such that the display media is easier to look at.

A vehicle seat armrest according to a fourth aspect of the present disclosure is the vehicle seat armrest according to the first aspect or the second aspect, wherein the second armrest includes a cutout portion so as not to contact the seatback side portion when rotating from the upper surface side of the first armrest toward the seat front side.

In the armrest according to the fourth aspect, the cutout portion is formed in the second armrest so as not to contact the seatback side portion when rotating toward the seat front side from an upper surface side of the first armrest. Thus the second armrest is able to rotate from the upper surface side of the first armrest toward the seat front side smoothly.

As described above, the vehicle seat armrest according to the present disclosure is able to suppress swinging of a hand-held display medium during vehicle travel.

BRIEF DESCRIPTION OF THE DRAWINGS

Exemplary embodiments of the present disclosure will be described in detail based on the following figures, wherein.

DETAILED DESCRIPTION

Detailed description follows regarding exemplary embodiments according to the present disclosure, with reference to the drawings. Note that for ease of explanation, where appropriate in each of the drawings arrow UP indicates a seat upward direction, arrow FR indicates a seat front direction, arrow RH indicates a seat right direction, and arrow LH indicates a seat left direction. Thus, as described below, unless specifically stated otherwise, reference to up and down, front and rear, and left and right directions indicate up and down, front and rear, and left and right directions for a vehicle seat 10 illustrated in FIG. 1. The left-right direction means the same as a seat width direction.

First Exemplary Embodiment

Figure 1:
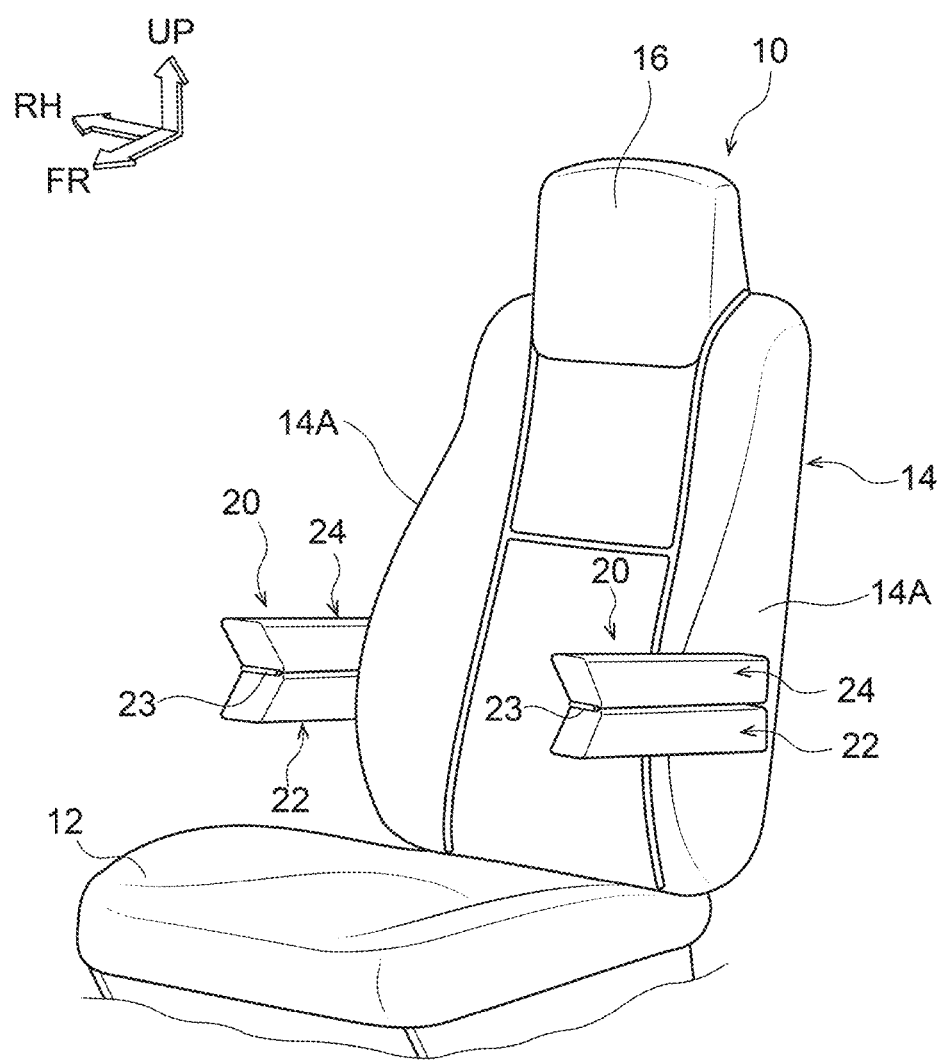
FIG. 1 is a schematic perspective view illustrating a vehicle seat provided with an armrest according to a first exemplary embodiment.

First description follows regarding an armrest 20 according to a first exemplary embodiment. As illustrated in FIG. 1, the vehicle seat 10 provided to a vehicle (omitted in the drawings) includes a seat cushion 12 for an occupant to sit on (to support the thighs and buttocks region of an occupant), a seatback 14 to support the back of an occupant, a headrest 16 to support the head of an occupant, and an armrest 20 to support the forearm (from the elbow to the back of the hand, as described later) of an occupant.

As illustrated in FIG. 2 to FIG. 4, the armrest 20 is a foldable armrest including a first armrest 22 having a cuboidal shape, and a second armrest 24 having a cuboidal shape, and armrests 20 are provided to both left and right side portions 14A (see FIG. 1) of the seatback 14 so that they are left-right symmetrical. Note that the armrest 20 is not limited to a configuration in which the armrests 20 are provided to both the left and right side portions 14A of the seatback 14, and may be provided to only the side portion 14A at the vehicle width direction outside or inside.

In the first armrest 22, a length direction first end portion 22A of the first armrest 22 is supported by a shaft portion 18 provided to the side portion 14A of the seatback 14 with an axial direction running along the seat width direction, so as to be able to rotate with a specific rotational resistance (i.e., friction). The first armrest 22 is configured so as to selectively adopt a not-in-use position, in which the first armrest 22 is positioned so as to extend toward the upper side along the side portion 14A of the seatback 14, and an in-use position, in which a length direction second end portion 22B thereof is rotated from the side portion 14A of the seatback 14 toward the front side and the first armrest 22 is positioned so as to extend toward the front side.

In the second armrest 24, a length direction first end portion 24A is supported by a hinge portion 23 provided between the second armrest 24 and the length direction second end portion 22B of the first armrest 22 so as to be able to rotate with a specific rotational resistance (i.e., friction). The second armrest 24 is configured so as to selectively adopt a stowed position, in which the second armrest 24 is positioned at an upper surface side of the first armrest 22 in the in-use position of the first armrest 22, and a deployed position, in which a length direction second end portion 24B thereof is rotated from the upper surface side of the first armrest 22 toward the front side and the second armrest 24 is positioned so as to extend obliquely upward in side view, and so as to extend obliquely toward the seat width direction inside in plan view.

Figure 2A:
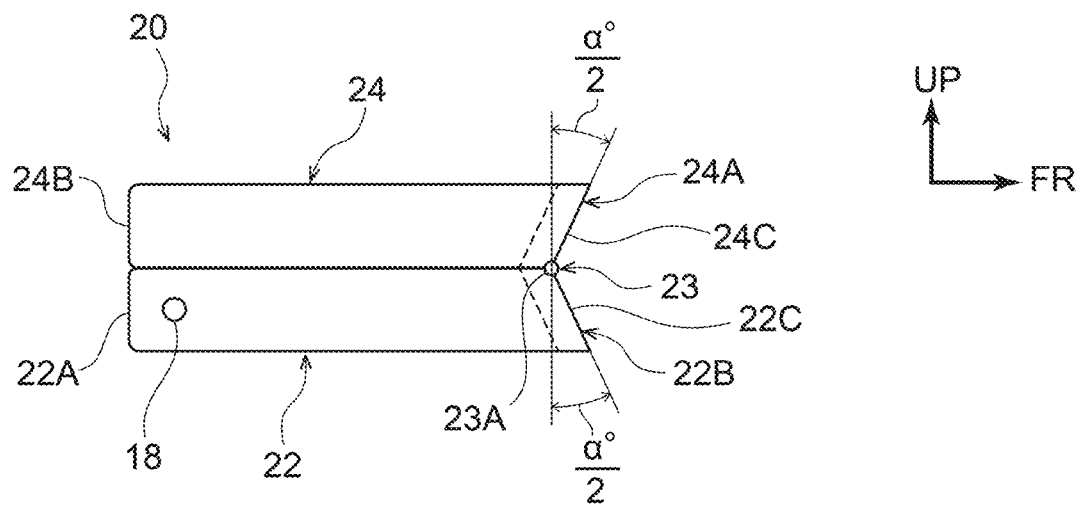
FIG. 2A is a schematic side view illustrating a second armrest according to the first exemplary embodiment, prior to deployment.
Figure 3A:
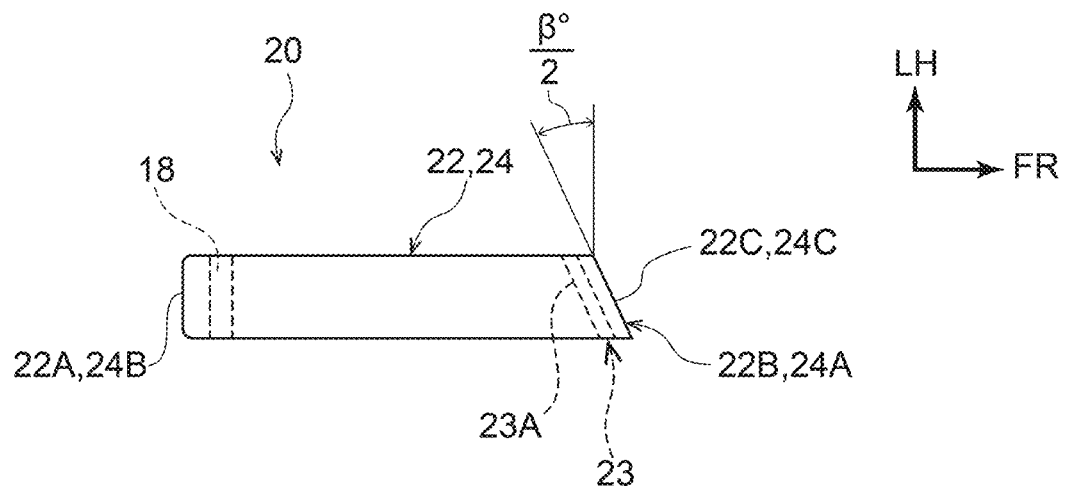
FIG. 3A is a schematic plan view illustrating a second armrest according to the first exemplary embodiment, prior to deployment.

More specifically, in the in-use position of the first armrest 22, an end surface of the length direction second end portion 22B of the first armrest 22 configures an inclined surface 22C that is inclined from an upper end portion toward a front lower side in the side view illustrated in FIG. 2A at a specific angle ($\alpha°/2$ with respect to the up-down direction), and inclined from a seat width direction inside end portion toward the seat width direction outside and the seat front side in the plan view illustrated in FIG. 3A at a specific angle ($\beta°/2$ with respect to the left-right direction).

In the stowed position of the second armrest 24 (in-use position of the first armrest 22), an end surface of the length direction first end portion 24A of the second armrest 24 configures an inclined face 24C that is inclined from a lower end portion toward a front upper side in the side view illustrated in FIG. 2A at a specific angle ($\alpha°/2$ with respect to the up-down direction), and inclined from a seat width direction inside end portion toward the seat width direction outside and the seat front side in the plan view illustrated in FIG. 3A at a specific angle ($\beta°/2$ with respect to the left-right direction).

Figure 4A:
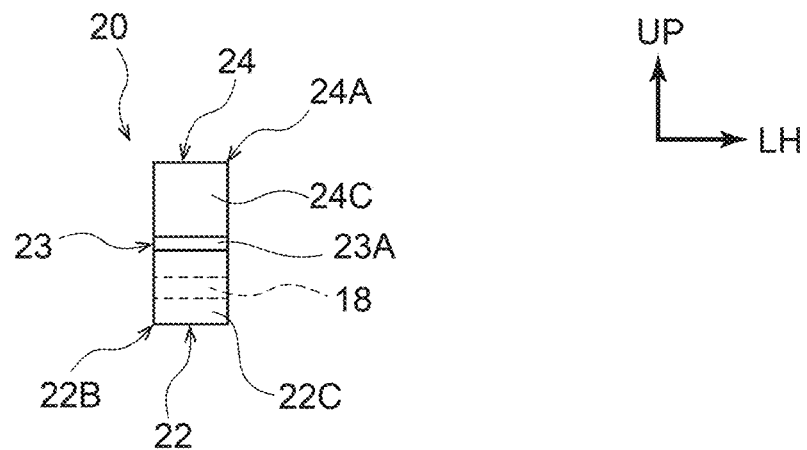
FIG. 4A is a schematic front view illustrating a second armrest according to the first exemplary embodiment, prior to deployment.

Moreover, as illustrated in FIG. 4A, the hinge portion 23 is provided between the inclined surface 22C and the inclined surface 24C such that in the stowed position of the second armrest 24, a rotation axis 23A of the hinge portion 23 is positioned at an upper side of the inclined surface 22C and at a lower side of the inclined surface 24C with an axial direction along the seat width direction in front view.

Figure 2B:
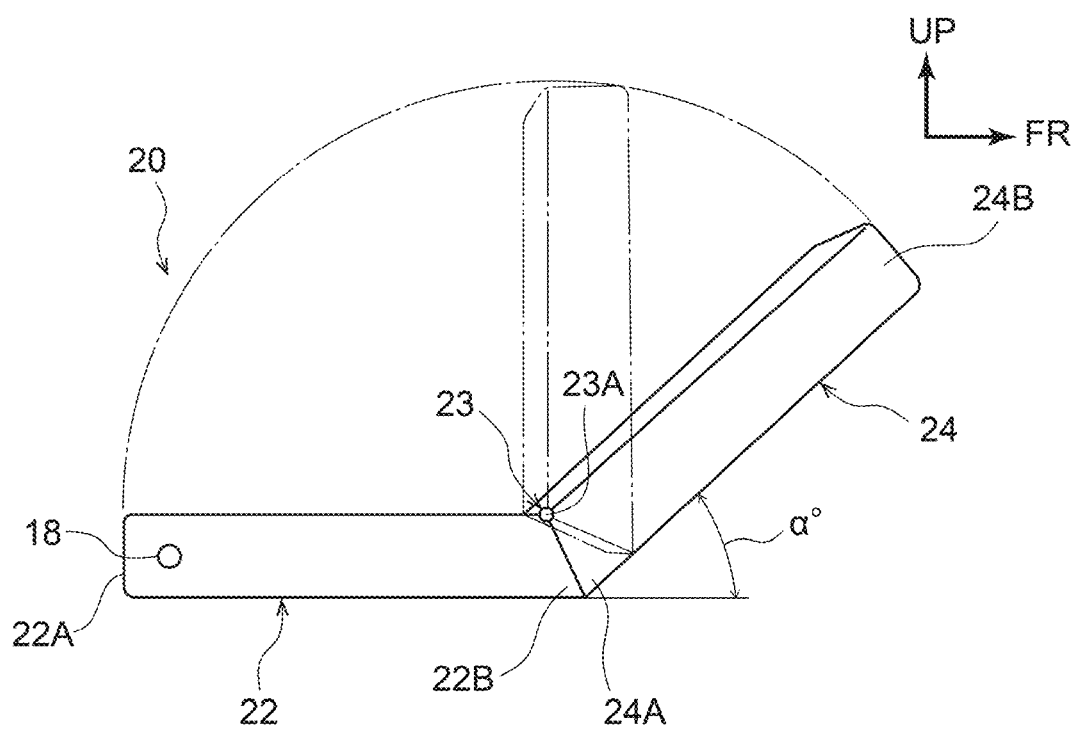
FIG. 2B is a schematic side view illustrating a second armrest according to the first exemplary embodiment, after deployment.
Figure 3B:
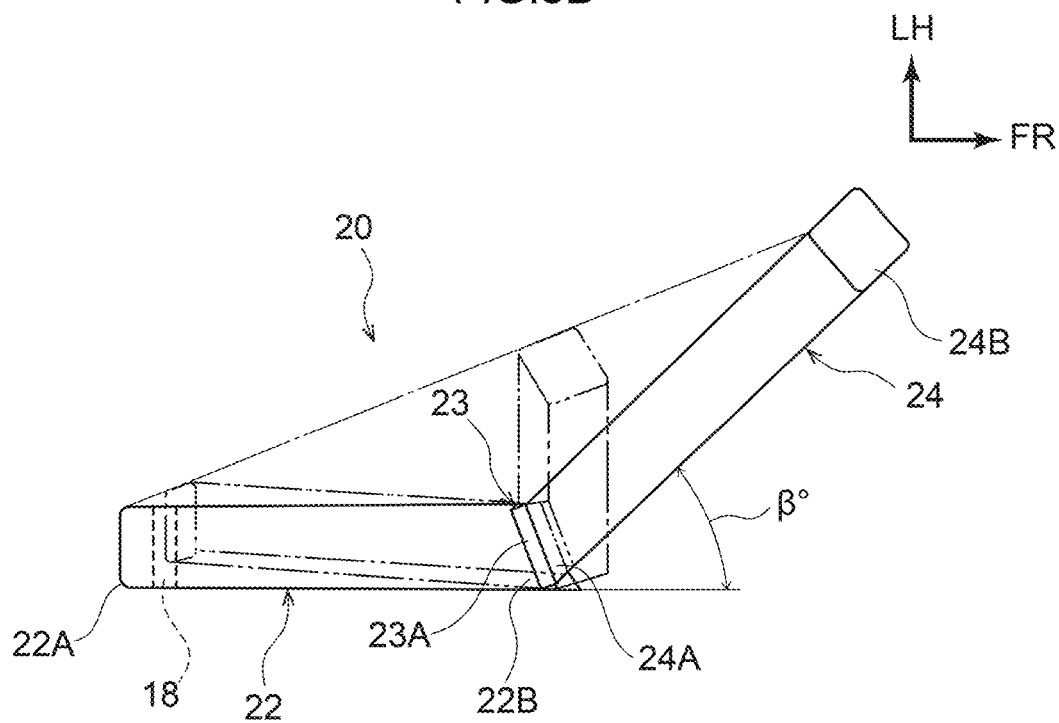
FIG. 3B is a schematic plan view illustrating a second armrest according to the first exemplary embodiment, after deployment.

Thereby, when the second armrest 24 has been rotated about the rotation axis 23A from the upper side and adopted the deployed position, the inclined surface 24C abuts against the inclined surface 22C, the second armrest 24 is configured to be positioned so as to extend obliquely upwards with respect to the extension direction of the first armrest 22 at a specific angle ($\alpha°$: for example $\alpha°=40°$ to $50°$) in the side view illustrated in FIG. 2B, and so as to extend obliquely toward the seat width direction inside with respect to the extension direction of the first armrest 22 at a specific angle ($\beta°$: for example $\beta°=40°$ to $50°$) in the plan view illustrated in FIG. 3B.

Next, description follows regarding the operation and advantageous effects of the armrest 20 according to the first exemplary embodiment configured as described above.

Figure 4B:
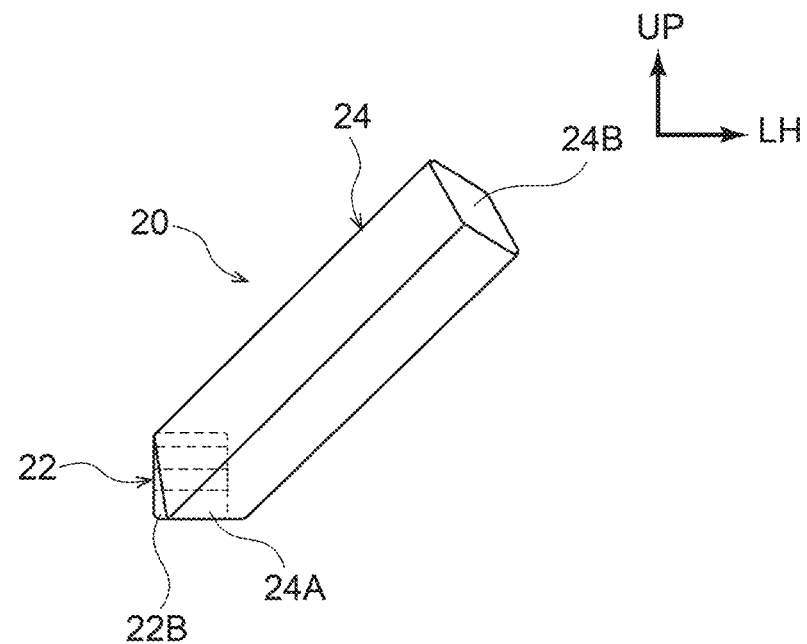
FIG. 4B is a schematic front view illustrating a second armrest according to the first exemplary embodiment, after deployment.

As illustrated in FIG. 2A, FIG. 3A, and FIG. 4A, in the in-use position in which the first armrest 22 is rotated from the side portion 14A of the seatback 14 toward the front side and is positioned so as to extend toward the front side, the second armrest 24 is rotated from the upper surface side of the first armrest 22 toward the front side and adopts the deployed position as illustrated in FIG. 2B, FIG. 3B, and FIG. 4B.

When the second armrest 24 adopts the deployed position, the second armrest 24 is disposed so as to extend obliquely upward with respect to the extension direction of the first armrest 22 at a specific angle ($\alpha°$) in side view, and so as to extend obliquely toward the seat width direction inside at a specific angle ($\beta°$) in plan view.

Thus the elbow to the back of the hand of an occupant seated in the vehicle seat 10 can be placed in a comfortable posture from the upper surface of the first armrest 22 across to the upper surface of the second armrest 24. Namely, the elbow to the back of the hand of the occupant seated in the vehicle seat 10 can be effectively supported at an appropriate angle by the armrests 20 (the first armrest 22 and the second armrest 24).

This accordingly enables a hand holding a smartphone, which is an example of a display medium, to be retained comfortably at a position higher than the elbow (i.e., near the chest) during vehicle travel. Thus when a smartphone is being held in the hand, even when a screen thereof (i.e., a video, still images, text, or the like displayed on the screen) is being viewed, the hand-held smartphone can be suppressed from swinging due to vibrations during vehicle travel. Namely, a screen of the smartphone can be suppressed from becoming hard to see, and a reduction in the operability with respect to the smartphone can be suppressed from occurring.

Moreover, due to relative movement between the smartphone and the gaze of the occupant being reduced, a reduction can be achieved in occurrence of car sickness due to gazing at a screen of a swinging smartphone for a prolonged period of time in a downward facing posture. Moreover, due to the retained position of the smartphone being stably maintained at a high position, the occurrence of neck pain due to an occupant maintaining a downward facing posture for a prolonged period of time can also be reduced. Furthermore, due to the field of view of the occupant being maintained at a high position, vehicle peripheral information is easily acquired visually by the occupant.

The armrest 20 is also a foldable armrest comprising the first armrest 22 and the second armrest 24. This means that the armrest 20 has excellent space saving properties, and enables great improvements to be made in ease of installation to the vehicle seat 10 (or to the seatback 14).

Second Exemplary Embodiment

Next, description follows regarding the armrest 20 according to a second exemplary embodiment. Note that the same reference numerals are appended to equivalent portions to those in the first exemplary embodiment, and detailed explanation thereof (including common operation and advantageous effects) will be omitted.

Figure 5A:
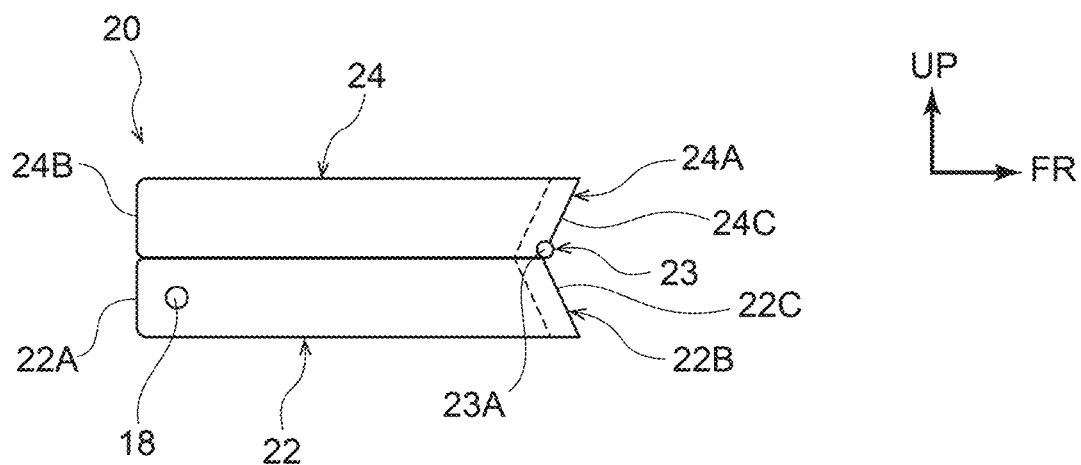
FIG. 5A is a schematic side view illustrating a second armrest according to a second exemplary embodiment, prior to deployment.
Figure 5B:
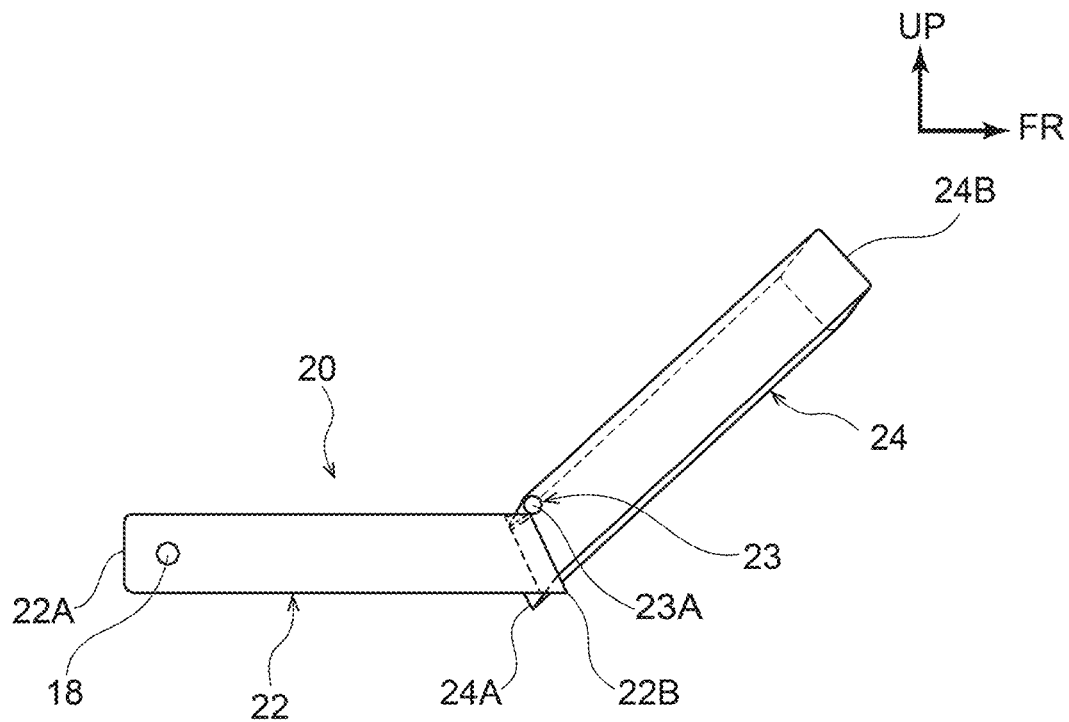
FIG. 5B is a schematic side view illustrating a second armrest according to the second exemplary embodiment, after deployment.
Figure 6A:
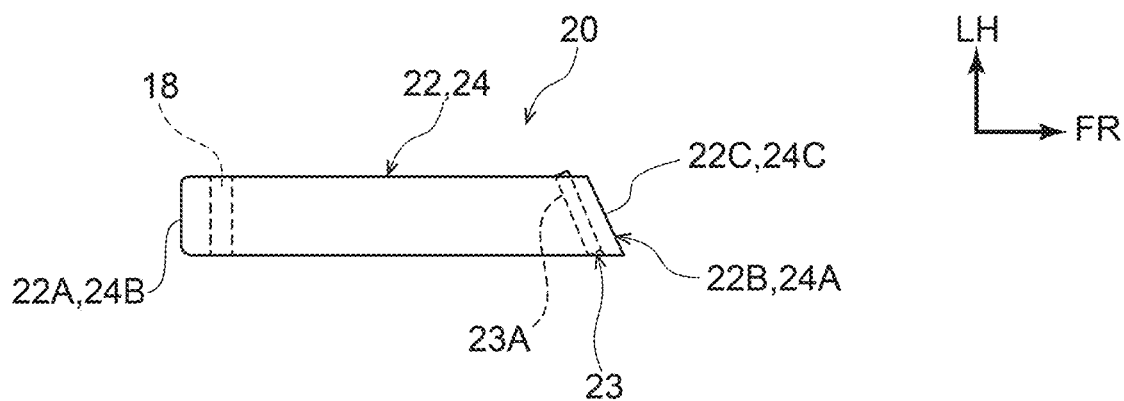
FIG. 6A is a schematic plan view illustrating a second armrest according to the second exemplary embodiment, prior to deployment.
Figure 6B:
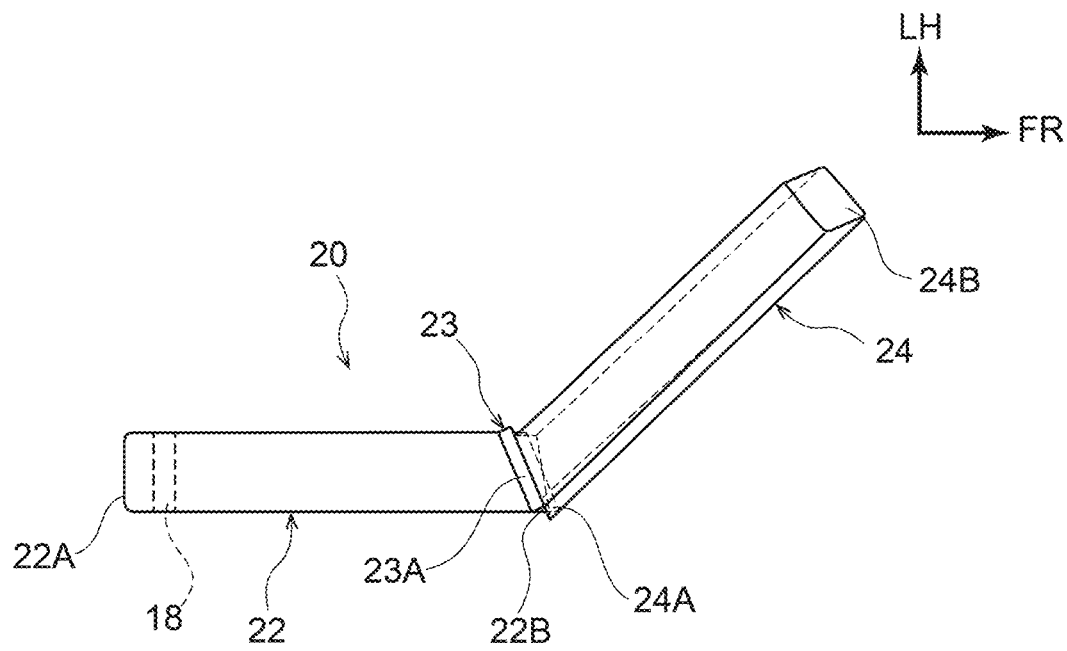
FIG. 6B is a schematic plan view illustrating a second armrest according to the second exemplary embodiment, after deployment.
Figure 7A:
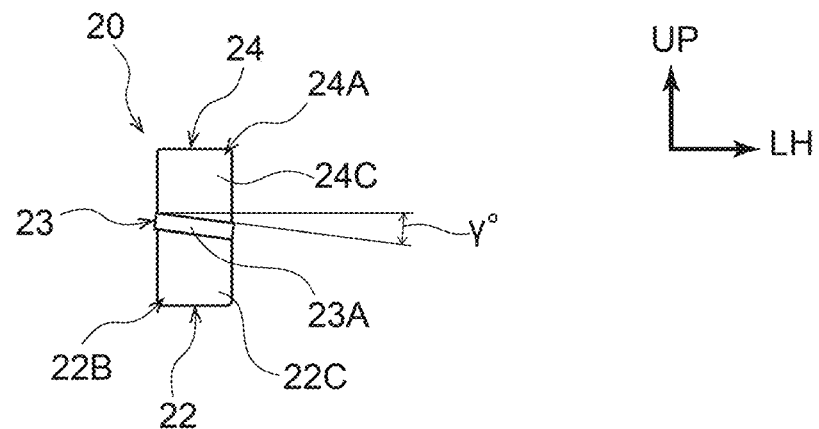
FIG. 7A is a schematic front view illustrating a second armrest according to the second exemplary embodiment, prior to deployment.
Figure 7B:
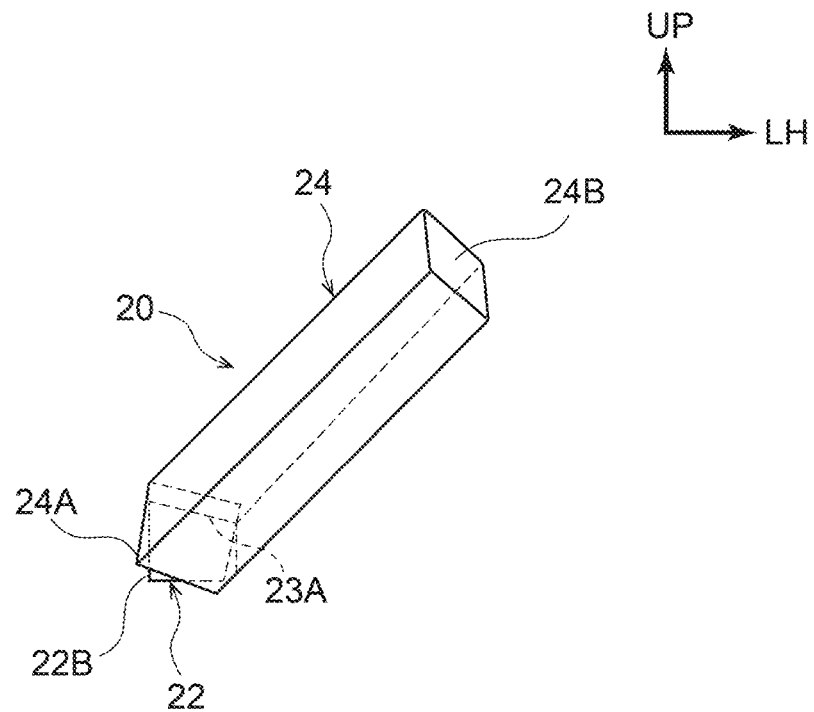
FIG. 7B is a schematic front view illustrating a second armrest according to the second exemplary embodiment, after deployment.

As illustrated in FIG. 5 to FIG. 7, the armrest 20 according to the second exemplary embodiment differs from that of the first exemplary embodiment in the point that a rotation axis 23A of the hinge portion 23 is inclined with respect to the seat width direction in front view. Namely, in the front view illustrated in FIG. 7A, the rotation axis 23A is provided so as to be inclined facing from a seat width direction outside end portion toward the seat width direction inside and the seat lower side at a specific angle ($\gamma°$ with respect to the left-right direction: for example, $\gamma°=5°$ to $15°$).

Thus when the deployed position is adopted, the upper surface of the second armrest 24 faces further toward the seat width direction inside than that in the first exemplary embodiment. Namely, the upper surface of the second armrest 24 is positioned inclined so as to face toward the seat width direction inside and the seat upper side at an angle closer to the vertical direction in front view than that in the first exemplary embodiment.

Thus the elbow to the back of the hand of the occupant seated in the vehicle seat 10 can be placed in a more comfortable posture on the upper surface of this second armrest 24 than in cases in which the upper surface of the second armrest 24 faces toward the upper side in front view. Namely, the elbow to the back of the hand of the occupant seated in the vehicle seat 10 can be effectively supported by this upper surface of the second armrest 24 at an appropriate angle (more natural angle) so as to make the screen of a hand-held smartphone even more easily viewed and more easily operated.

Third Exemplary Embodiment

Next, description follows regarding an armrest 20 according to a third exemplary embodiment. Note that the same reference numerals are appended to equivalent portions to those in the first exemplary embodiment and the second exemplary embodiment, and detailed explanation thereof (including common operation and advantageous effects) will be omitted.

Figure 8A:
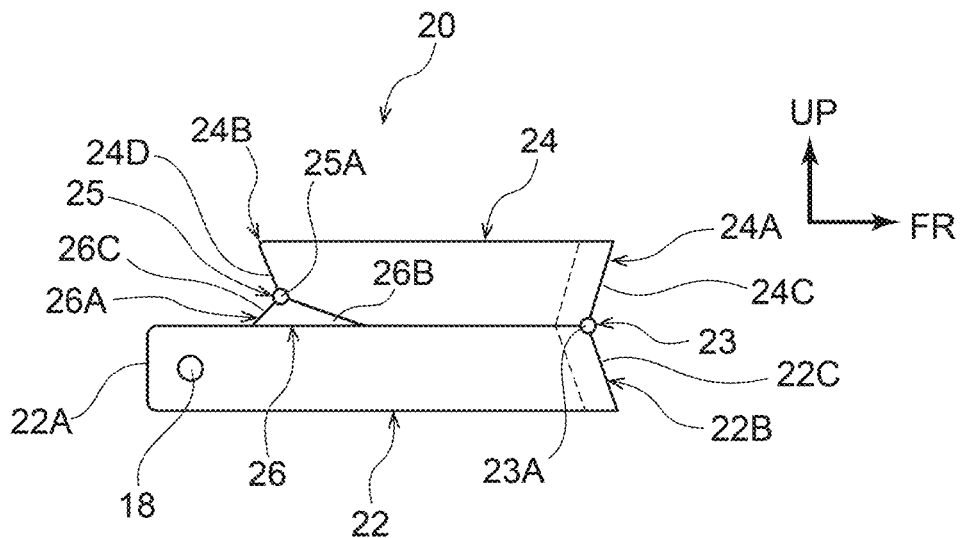
FIG. 8A is a schematic side view illustrating a second armrest and a third armrest according to the third exemplary embodiment, prior to deployment.
Figure 8B:
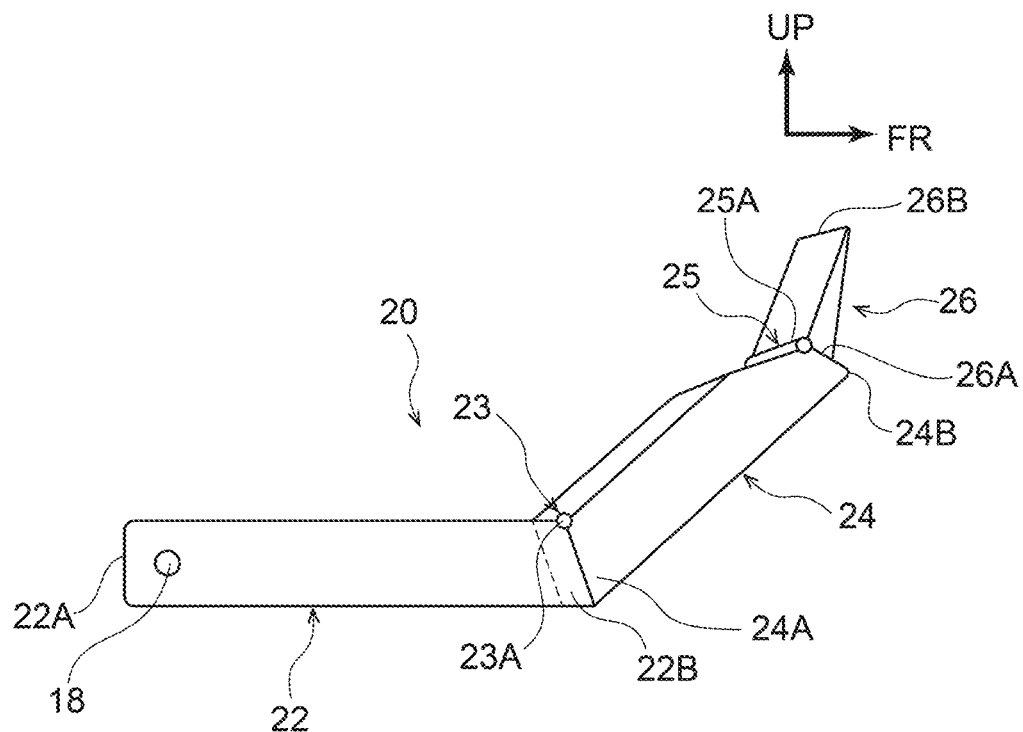
FIG. 8B is a schematic side view illustrating a second armrest and a third armrest according to the third exemplary embodiment, after deployment.
Figure 9A:
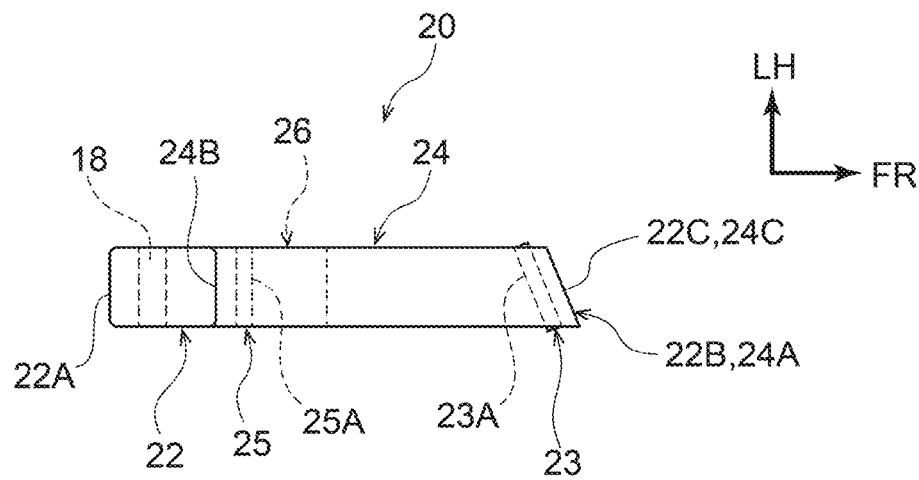
FIG. 9A is a schematic plan view illustrating a second armrest and a third armrest according to the third exemplary embodiment, prior to deployment.
Figure 9B:
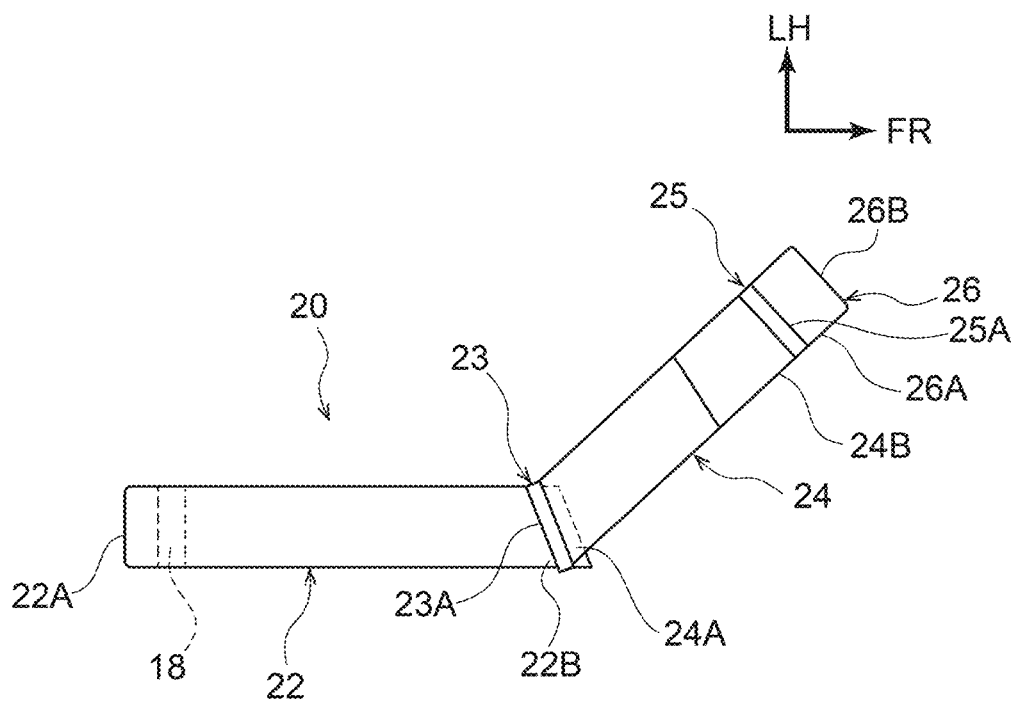
FIG. 9B is a schematic plan view illustrating a second armrest and a third armrest according to the third exemplary embodiment, after deployment.
Figure 10A:
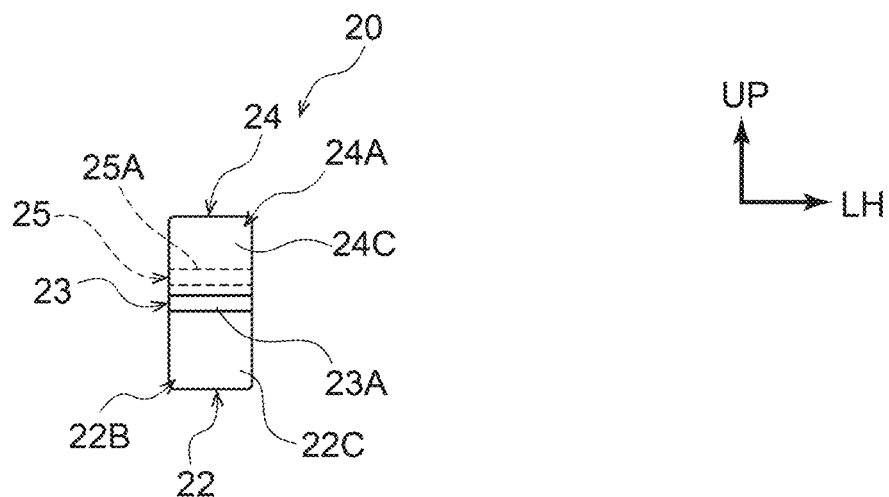
FIG. 10A is a schematic front view illustrating a second armrest and a third armrest according to the third exemplary embodiment, prior to deployment.
Figure 10B:
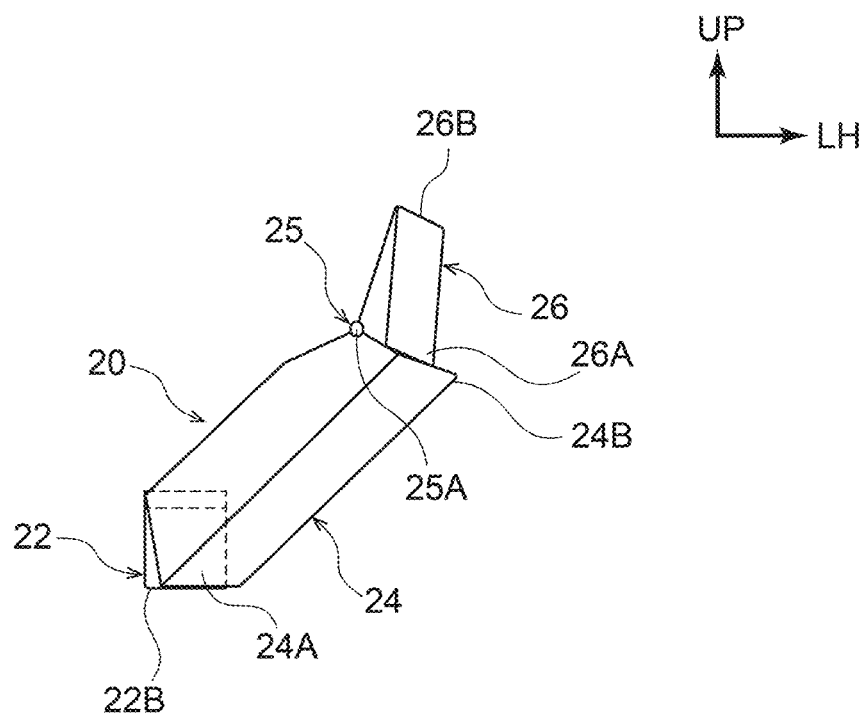
FIG. 10B is a schematic front view illustrating a second armrest and a third armrest according to the third exemplary embodiment, after deployment.

As illustrated in FIG. 8 to FIG. 10, the armrest 20 according to the third exemplary embodiment differs from that of the first exemplary embodiment in the points that the armrest 20 is provided with a rotatable third armrest 26 at a length direction second end portion 24B side of the second armrest 24, and that the length of the second armrest 24 is shortened by a length that corresponds to the length of the third armrest 26.

The third armrest 26 is formed in a substantially triangular pillar shape having a height direction along the seat width direction, and a leading end portion 26B thereof (on the opposite side to a side of a hinge portion 25, described later) is pointed in an acute angle shape in side view as illustrated in FIG. 8A. A lower end portion of the length direction second end portion 24B is provided with a substantially triangular pillar shaped cutaway having a height direction along the seat width direction so as to be able to house the third armrest 26 when the second armrest 24 is in the stowed position.

A base end portion 26A (first end portion) of the third armrest 26 is supported by the hinge portion 25 provided between the base end portion 26A and the length direction second end portion 24B of the second armrest 24 so as to be able to rotate with a specific rotational resistance (i.e., friction). In the deployed position of the second armrest 24, the third armrest 26 is configured so as to be able to selectively adopt a folded position, in which the third armrest 26 is positioned on the upper surface side of the second armrest 24, and an extended position, in which the leading end portion 26B thereof is rotated from the upper surface side of the second armrest 24 toward the front side and the third armrest 26 is positioned so as to extend obliquely upward in side view.

More specifically, in the stowed position of the second armrest 24 (the in-use position of the first armrest 22), an end surface of the length direction second end portion 24B of the second armrest 24 configures an inclined face 24D that is inclined at a specific angle from an upper end portion towards the front lower side in the side view illustrated in FIG. 8A. The end surface of the base end portion 26A of the third armrest 26 configures an inclined face 26C that is inclined at a specific angle from a lower end portion towards the front upper side in the side view illustrated in FIG. 8A.

As illustrated in the example of FIG. 10A, in the stowed position of the second armrest 24, a rotation axis 25A of the hinge portion 25 is provided between the inclined surface 24D and the inclined surface 26C so as to be positioned at a lower side of the inclined surface 24D and at an upper side of the inclined surface 26C with an axial direction along the seat width direction in front view.

Thereby, when the third armrest 26 has adopted an extended position rotated from the upper side about the rotation axis 25A, the inclined face 26C abuts against the inclined face 24D, the third armrest 26 is configured to be positioned so as to extend obliquely upward with respect to the extension direction of the second armrest 24 at a specific angle in side view.

This accordingly enables the elbow to the back of the hand of the occupant seated in the vehicle seat 10 to be placed in a comfortable posture across from the upper surface of the first armrest 22 to the upper surfaces of the second armrest 24 and the third armrest 26. Namely, the elbow to the back of the hand of the occupant seated in the vehicle seat 10 can be effectively supported by the armrests 20 (i.e., the first armrest 22, the second armrest 24, and the third armrest 26) at an appropriate angle so as to make the screen of the hand-held smartphone easily viewed and easily operated.

Note that similarly to in the second exemplary embodiment, a rotation axis 23A of a hinge portion 23 in the armrest 20 according to the third exemplary embodiment may be inclined with respect to the seat width direction in front view. Namely, the rotation axis 23A may be provided so as to be inclined from a seat width direction outside end portion facing toward the seat width direction inside and the seat lower side at a specific angle ($\gamma°$ with respect to the left-right direction) in front view. Due to adopting such a configuration, the elbow to the back of the hand of the occupant seated in the vehicle seat 10 can be effectively supported at an even more appropriate angle (i.e., more natural angle).

Fourth Exemplary Embodiment

Next, description follows regarding an armrest 20 according to a fourth exemplary embodiment. Note that the same reference numerals are appended to equivalent portions to those in the first exemplary embodiment and the second exemplary embodiment, and detailed explanation thereof (including common operation and advantageous effects) will be omitted.

Figure 11A:
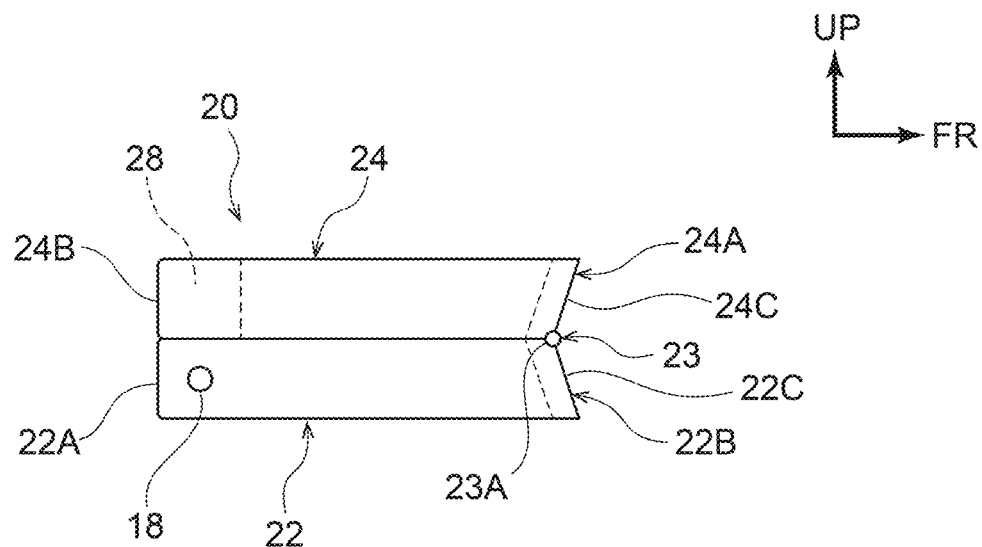
FIG. 11A is a schematic side view illustrating a second armrest according to a fourth exemplary embodiment, prior to deployment.
Figure 11B:
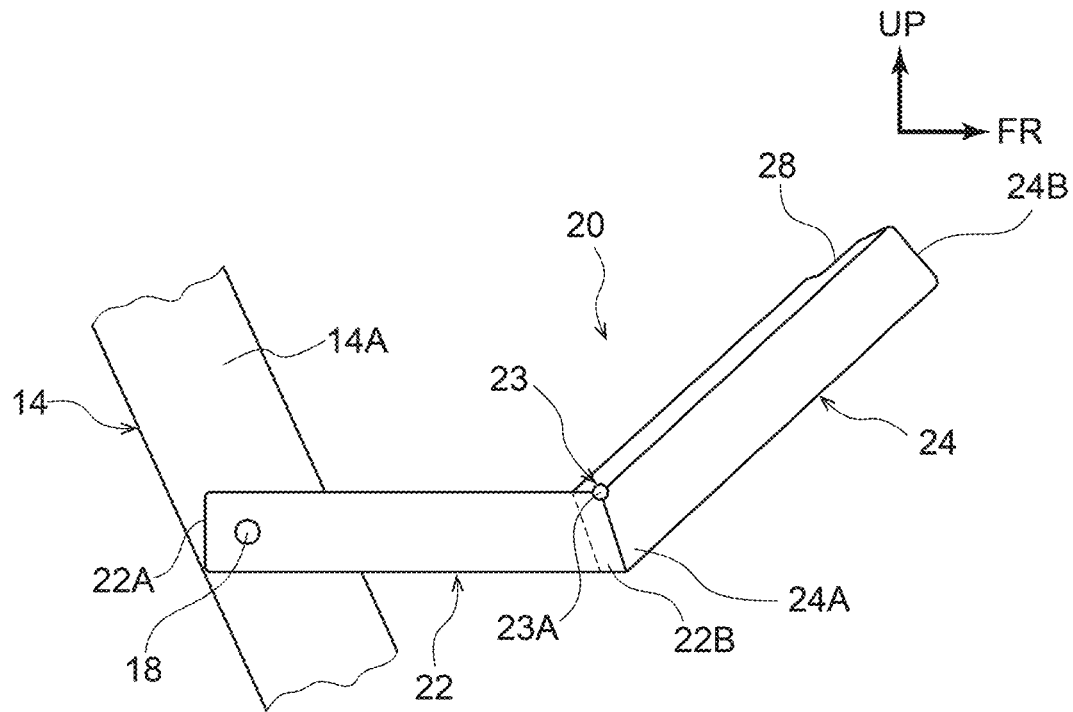
FIG. 11B is a schematic side view illustrating a second armrest according to the fourth exemplary embodiment, after deployment.
Figure 12A:
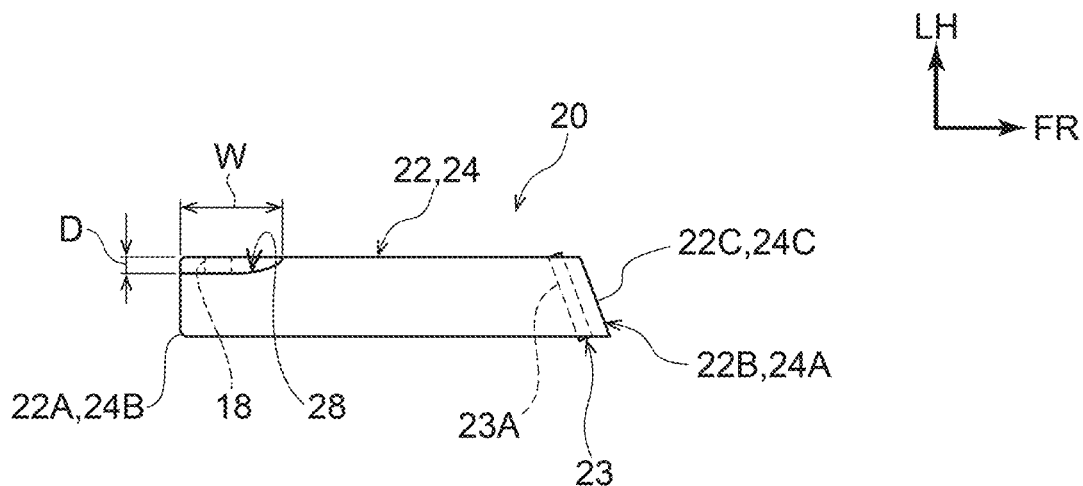
FIG. 12A is a schematic plan view illustrating a second armrest according to the fourth exemplary embodiment, prior to deployment.
Figure 12B:
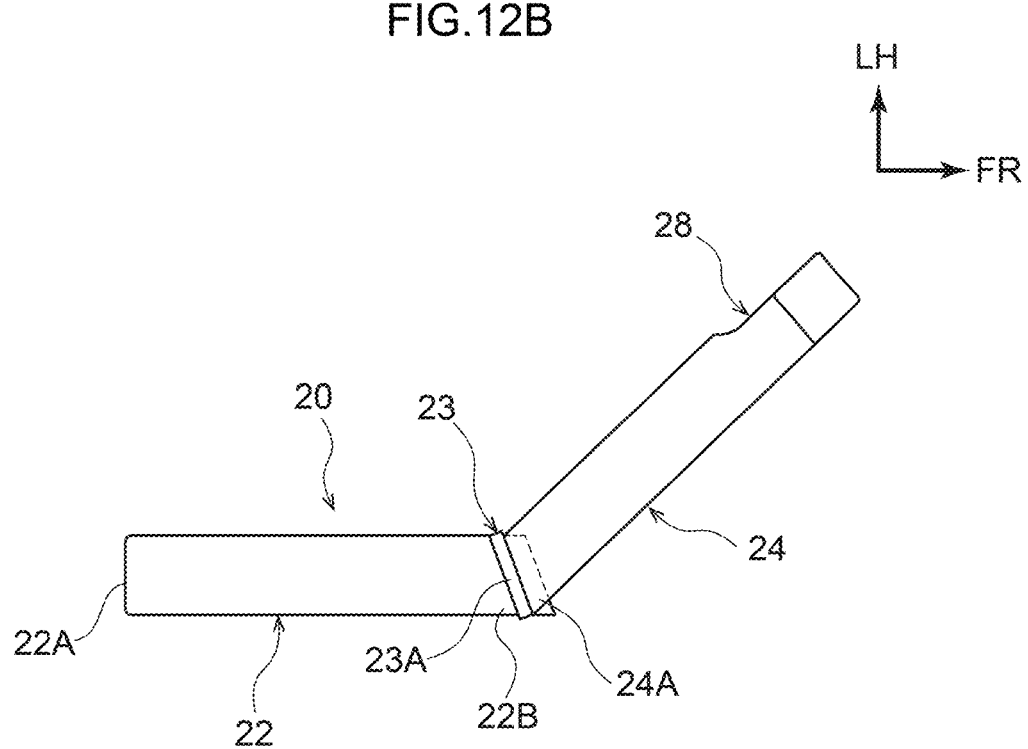
FIG. 12B is a schematic plan view illustrating a second armrest according to the fourth exemplary embodiment, after deployment.
Figure 13:
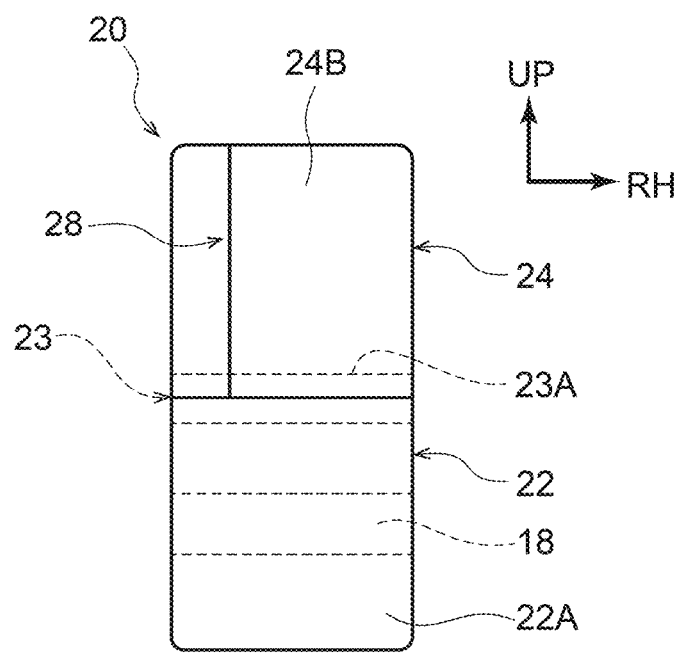
FIG. 13 is a schematic back view illustrating a second armrest according to the fourth exemplary embodiment, prior to deployment.

As illustrated in FIG. 11 to FIG. 13, an armrest 20 according to the fourth exemplary embodiment differs from those of the first exemplary embodiment and the second exemplary embodiment in the point that the second armrest 24 includes a cutout portion 28 so as not to contact the side portion 14A of the seatback 14 when the second armrest 24 is rotated from the upper surface side of the first armrest 22 toward the front side.

More specifically, in a stowed position of the second armrest 24, the cutout portion 28 having a specific width W (where W is a length along a length direction of the second armrest 24 where there is an overlap with the side portion 14A) and a specific depth D is formed across the entire height of the second armrest 24 in an area at the seat width direction inside of the length direction second end portion 24B opposing the side portion 14A of the seatback 14. Thus the second armrest 24 can be rotated from the upper surface side of the first armrest 22 toward the front side smoothly without interfering (i.e., sliding contact) with the side portion 14A of the seatback 14.

Lastly an armrest 20 according to a reference example will be described. Note that the same reference numerals are appended to equivalent portions to those in the first exemplary embodiment, and detailed explanation thereof (including common operation and advantageous effects) will be omitted.

As illustrated in FIG. 14 to FIG. 15, the armrest 20 according to the reference example differs from that of the first exemplary embodiment in a point that the second armrest 24 is positioned at a lower surface side of the first armrest 22 in the in-use position of the first armrest 22, and in a point that the second armrest 24 includes a lock mechanism 30 to fix the second armrest 24 with respect to the first armrest 22 when the second armrest 24 has adopted a stowed position and a deployed position in which it is rotated toward the front side.

Figure 14A:
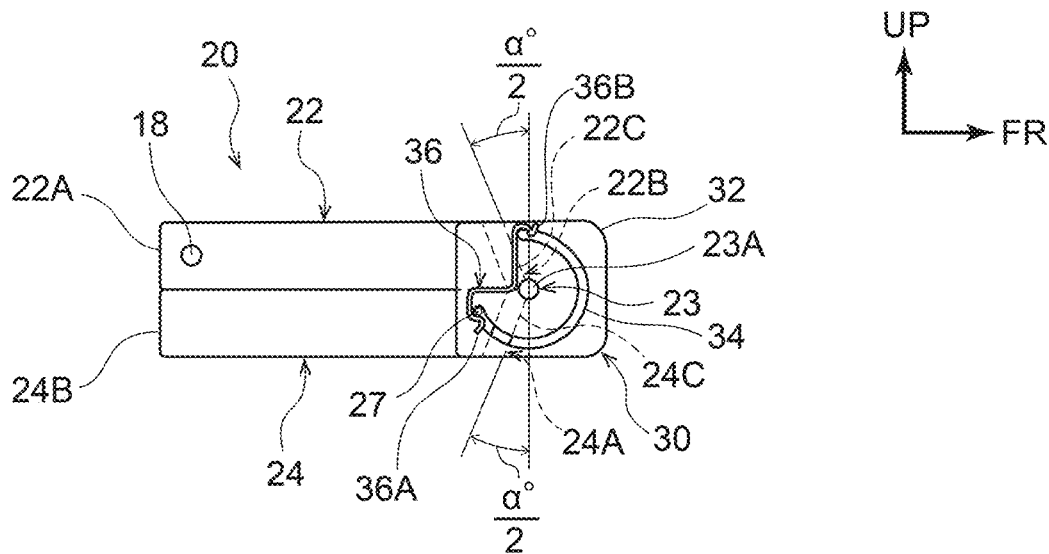
FIG. 14A is a schematic side view illustrating a second armrest according to a reference example, prior to deployment.
Figure 15A:
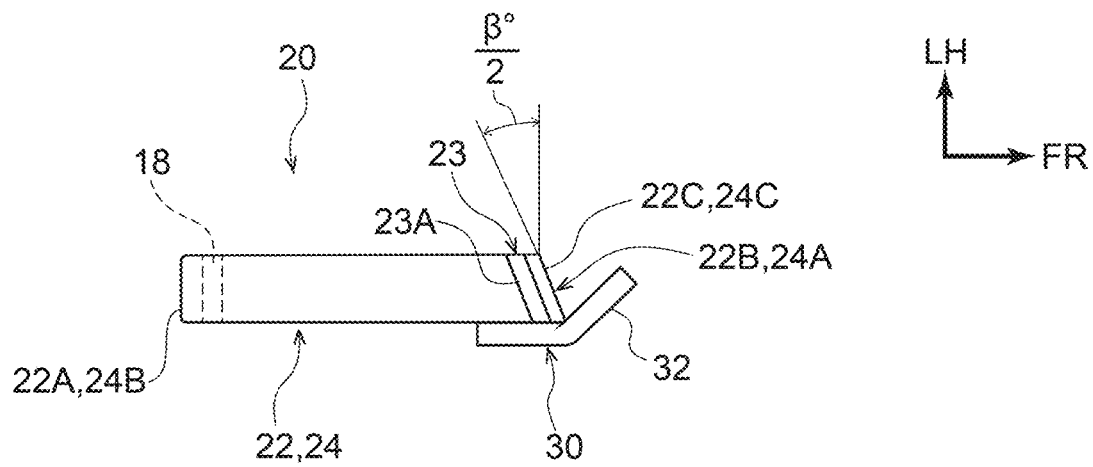
FIG. 15A is a schematic plan view illustrating a second armrest according to the reference example, prior to deployment.

More specifically, in the in-use position of the first armrest 22, an end face of the length direction second end portion 22B of the first armrest 22 configures an inclined surface 22C that is inclined from an upper end portion facing toward the front lower side at a specific angle ($\alpha°/2$ with respect to the up-down direction) in the side view illustrated in FIG. 14A, and that is inclined from a seat width direction inside end portion facing toward the seat width direction outside and the seat front side at a specific angle ($\beta°/2$ with respect to the left-right direction) in the plan view illustrated in FIG. 15A.

In the stowed position of the second armrest 24 (in the in-use position of the first armrest 22), an end surface of the length direction first end portion 24A of the second armrest 24 configures an inclined surface 24C that is inclined from a lower end portion facing toward the front upper side at a specific angle ($\alpha°/2$ with respect to the up-down direction) in the side view illustrated in FIG. 14A, and that is inclined from a seat width direction inside end portion facing toward the seat width direction outside and the seat front side at a specific angle ($\beta°/2$ with respect to the left-right direction) in the plan view illustrated in FIG. 15A.

Moreover, as illustrated in FIG. 14, a rotation axis 23A of a hinge portion 23 is provided between the inclined face 22C and the inclined face 24C so as, in the stowed position of the second armrest 24, to be positioned at a lower side of the inclined face 22C and at an upper side of the inclined face 24C with an axial direction along the seat width direction in front view.

Figure 14B:
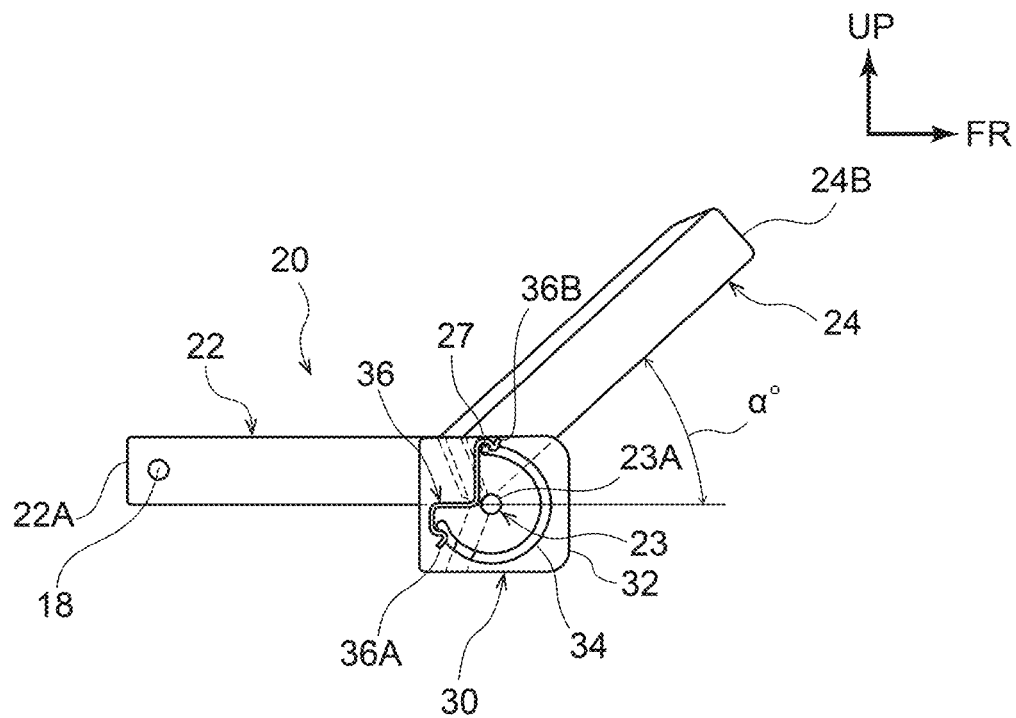
FIG. 14B is a schematic side view illustrating a second armrest according to the reference example, after deployment.
Figure 15B:
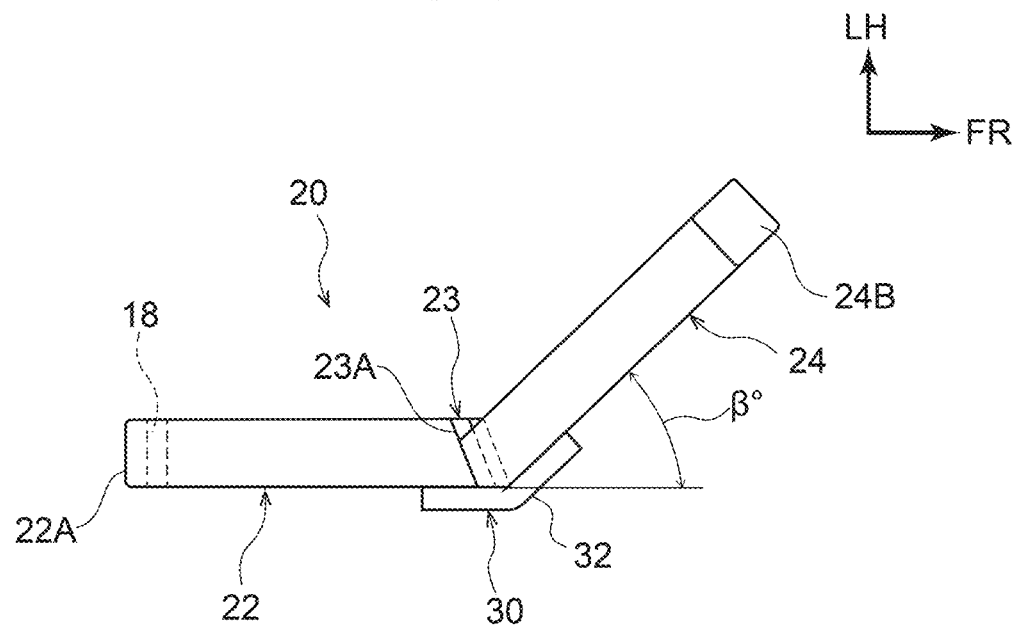
FIG. 15B is a schematic plan view illustrating a second armrest according to the reference example, after deployment.

Thus when the second armrest 24 adopts the deployed position rotated from the lower side about the rotation axis 23A, the inclined face 24C abuts against the inclined face 22C, the second armrest 24 is configured to be positioned so as to extend obliquely upward with respect to the extension direction of the first armrest 22 at a specific angle ($\alpha°$) in the side view illustrated in FIG. 14B, and to extend obliquely toward the seat width direction inside at a specific angle ($\beta°$) in the plan view illustrated in FIG. 15B.

The lock mechanism 30 is configured so as to be able to retain the second armrest 24 in the stowed position and the deployed position with respect to the first armrest 22. Namely, a circular column shaped guide pin 27 (see FIG. 14) is provided protruding on an outside surface of the second armrest 24 facing toward the seat width direction outside so as to protrude toward the seat width direction outside, and the lock mechanism 30 is configured so as to retain this guide pin 27 respectively in the stowed position and the deployed position.

The lock mechanism 30 includes a circular arc shaped guide groove 34 inside a case 32, and the guide pin 27 is inserted into the guide groove 34 and is configured to move along the guide groove 34. A one-end portion 36A of a plate spring 36, which is capable of retaining the guide pin 27 when the second armrest 24 has adopted the stowed position, is positioned at an extension direction one end side of the guide groove 34 of the case 32, and an other-end portion 36B of the plate spring 36, which is capable of retaining the guide pin 27 when the second armrest 24 has adopted the deployed position, is positioned at an extension direction other end side of the guide groove 34 of the case 32.

The one-end portion 36A of the plate spring 36 juts out at a specific angle inside the guide groove 34, in a configuration such that when the guide pin 27 causes the one-end portion 36A of the plate spring 36 to elastically deform and moves past the one-end portion 36A, the guide pin 27 is retained at the extension direction one end side inside the guide groove 34. Namely, this results in a configuration in which the second armrest 24 is retained in the stowed position.

Similarly the other-end portion 36B of the plate spring 36 juts out at a specific angle inside the guide groove 34, in a configuration such that when the guide pin 27 causes the other-end portion 36B of the plate spring 36 to elastically deform and moves past the other-end portion 36B, the guide pin 27 is retained at the extension direction other end side in the guide groove 34. Namely, this results in a configuration in which the second armrest 24 is retained in the deployed position.

The armrest 20 according to the reference example configured as described above has an advantage in that, different to those of the first exemplary embodiment to the fourth exemplary embodiment, a height position of the first armrest 22 positioned in the in-use position can be made so as not to change (i.e., it can be able to be maintained at the same height position) even when the second armrest 24 is positioned in the deployed position.

Although the armrest 20 of the vehicle seat 10 according to the present exemplary embodiments has been described with reference to the drawings, the armrest 20 of the vehicle seat 10 according to the present exemplary embodiments is not limited to those illustrated, and appropriate design changes may be made thereto within a range not departing from the spirit of the present disclosure.

For example, each of the upper surfaces where the elbow to the back of the hand of the occupant is placed may be formed in a substantially circular arc shape having a slight indentation or the like when viewed in a cross-section perpendicular to the length direction in the first armrest 22 positioned in the in-use position and in the second armrest 24 positioned in the deployed position. Adopting such an approach enables improvement of holding performance of the elbow to the back of the hand of the occupant by the upper surface of the first armrest 22 and the upper surface of the second armrest 24.

Moreover, in the third exemplary embodiment, the length of the second armrest 24 is shorter than those in the first exemplary embodiment and the second exemplary embodiment due to the third armrest 26 being provided. This means that when the second armrest 24 of the third exemplary embodiment has been rotated to the deployed position, there is no interfering (i.e., sliding contact) of the second armrest 24 with the side portion 14A of the seatback 14 even without providing a cutout portion 28 such as that of the fourth exemplary embodiment. Namely, the second armrest 24 of the third exemplary embodiment is also able to be rotated to the deployed position smoothly.

What is claimed is:

1. A vehicle seat armrest comprising:
a first armrest including a first end portion rotatably supported by a side portion of a seatback, and selectively adopting a not-in-use position in which the first armrest is positioned so as to extend toward a seat upper side at the seatback side portion, and an in-use position in which the first armrest is positioned so as to be rotated from the seatback side portion toward a seat front side, so as to extend toward the seat front side; and
a second armrest including a first end portion rotatably supported by a second end portion of the first armrest, and, in the in-use position, selectively adopting a stowed position in which the second armrest is positioned at an upper surface side of the first armrest and a deployed position in which the second armrest is positioned so as to be rotated from the upper surface side of the first armrest toward the seat front side, so as to extend obliquely toward a seat upper side in side view and so as to extend obliquely toward a seat width direction inside in plan view.

2. The vehicle seat armrest of claim 1, wherein the second armrest is formed in a cuboidal shape and, in the deployed position, is positioned obliquely such that an upper surface of the second armrest faces toward the seat width direction inside and the seat upper side in front view.

3. The vehicle seat armrest of claim 1, further comprising:
a third armrest including a first end portion rotatably supported by a second end portion of the second armrest, and, in the deployed position, selectively adopting a folded position in which the third armrest is positioned at an upper surface side of the second armrest and an extended position in which the third armrest is positioned so as to be rotated from the upper surface side of the second armrest toward the seat front side, so as to extend obliquely toward the seat upper side in side view.

4. The vehicle seat armrest of claim 1, wherein:
the second armrest includes a cutout portion so as not to contact the seatback side portion when rotating from the upper surface side of the first armrest toward the seat front side.

5. The vehicle seat armrest of claim 2, further comprising:
a third armrest including a first end portion rotatably supported by a second end portion of the second armrest, and, in the deployed position, selectively adopting a folded position in which the third armrest is positioned at an upper surface side of the second armrest and an extended position in which the third armrest is positioned so as to be rotated from the upper surface side of the second armrest toward the seat front side, so to extend obliquely toward the seat upper side in side view.

6. The vehicle seat armrest of claim 2, wherein:
the second armrest includes a cutout portion so as not to contact the seatback side portion when rotating from the upper surface side of the first armrest toward the seat front side.

* * * * *